(12) United States Patent
Kinoshita et al.

(10) Patent No.: US 10,989,987 B2
(45) Date of Patent: Apr. 27, 2021

(54) ELECTRONIC APPARATUS

(71) Applicant: LENOVO (SINGAPORE) PTE. LTD., Singapore (SG)

(72) Inventors: Hiroaki Kinoshita, Kanagawa (JP); Tabito Miyamoto, Kanagawa (JP); Shigehiro Horiuchi, Kanagawa (JP); Takehito Yamauchi, Kanagawa (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 0 days.

(21) Appl. No.: 16/900,393

(22) Filed: Jun. 12, 2020

(65) Prior Publication Data
US 2020/0393739 A1  Dec. 17, 2020

(30) Foreign Application Priority Data
Jun. 13, 2019  (JP) .............................. JP2019-110538

(51) Int. Cl.
G03B 11/04 (2021.01)
G06F 1/16 (2006.01)

(52) U.S. Cl.
CPC ............ G03B 11/04 (2013.01); G06F 1/1686 (2013.01)

(58) Field of Classification Search
CPC ..... G03B 11/04; G03B 11/041; G03B 11/043; G03B 11/045; G06F 1/1686
See application file for complete search history.

(56) References Cited

U.S. PATENT DOCUMENTS

2013/0088639 A1 * 4/2013 Mundt .................. H04N 5/232
                                                 348/372
2013/0169862 A1  7/2013 Han et al.
2018/0314292 A1  11/2018 Son

FOREIGN PATENT DOCUMENTS

| JP | 07036215 A | 2/1995 |
|---|---|---|
| JP | 2007065443 A | 3/2007 |
| JP | 2007140088 A | 6/2007 |
| JP | 2009075305 A | 4/2009 |
| JP | 2019028157 | 2/2019 |

* cited by examiner

*Primary Examiner* — Minh Q Phan
(74) *Attorney, Agent, or Firm* — Antony P. Ng; Russell Ng PLLC

(57) ABSTRACT

An electronic apparatus is disclosed. The electronic apparatus includes a display, a frame surrounding the display, a camera disposed in the frame, a lens cover unit slidable between a first position and a second position in the frame, a lens cover covers a lens of the camera when the lens cover unit is at the first position, and exposes the lens when the lens cover unit is at the second position, a blade spring, which is fixed to the lens cover unit, is elastically deformable in a Z-direction, and a protrusion, which is fixed to the frame, presses the bent of the blade spring in the Z-direction to elastically deform the blade spring while the lens cover unit slides between the first position and the second position, and the bent moves over the protrusion after the elastic deformation.

13 Claims, 9 Drawing Sheets

ELECTRONIC APPARATUS

PRIORITY CLAIM

The present application claims benefit of priority under 35 U.S.C. §§ 120, 365 to the previously filed Japanese Patent Application No. JP2019-110538 with a priority date of Jun. 13, 2019, which is incorporated by reference herein.

TECHNICAL FIELD

The present invention relates to electronic apparatuses in general, and in particular to an electronic apparatus having a lens cover.

BACKGROUND

Some electronic apparatuses, such as a laptop personal computer (laptop PC), a tablet computer (tablet PC), and a multi-functional mobile phone (smart phone), usually come with a display. Typically, these electronic apparatuses employ a larger liquid crystal panel as a screen with a relatively narrow bezel surrounding the screen. In addition, many of these electronic apparatuses have a camera located on the display surface around the liquid crystal panel.

Such a camera on the display surface is typically directed to a user, and the user may feel uneasy because the camera may shoot them contrary to their intention even when the camera does not operate. When the camera is exposed, this may degrade the integrity with the frame in terms of the design. As one means of covering the camera, a manually slidable mechanical shutter as a cover member can be used.

For example, an electronic apparatus 500 may include a frame surrounding a display 502, and a camera 506 disposed at the upper frame 504, as illustrated in FIGS. 9A-9B. A cover member 508 is slidable along the upper frame between a first position and a second position. The cover member 508 at the first position covers the lens, as shown in FIG. 9A. When the cover member 508 is at the second position, the lens is exposed, as shown in FIG. 9B. The cover member 508 is manually slidable between the first position and the second position. The cover member is 508 desirably held at the first position or the second position so as not to move easily due to gravity or vibrations.

The cover member 508 includes a knob 510, a cover 512, and an elastic body 514. The knob 510 is manually operated laterally to slide the cover member 508 as a whole. The cover 512 at the first position in FIG. 9A covers the lens 506a of the camera 506, and the lens 506a is exposed when the cover 512 is at the second position in FIG. 9B. The elastic body 514a extends laterally, and has an action part 514a at the front end. The action part 514a is elastically displaceable vertically (up-down direction, Y direction). The frame 504 includes a protrusion 516 that protrudes downward. When the cover member 508 slides between the first position and the second position, the protrusion 516 presses the action part 514a downward to elastically deform the elastic body 514. After that, the action part 514a moves over the protrusion 516.

Such a configuration needs the elastic body 514 to be relatively thick in order to have moderate elasticity, and the frame 504 needs to have a certain width in Y direction to allow for the movement of the deformed elastic body 514. This leads to the difficulty to narrow the frame 504 in Y direction.

Consequently, it would be desirable to provide an electronic apparatus with a narrower frame including a lens cover.

SUMMARY

In accordance with an embodiment of the present disclosure, an electronic apparatus includes a display, a frame surrounding the display, a camera disposed in the frame, a lens cover unit slidable between a first position and a second position in the frame, and one protrusion. The lens cover unit includes a lens cover and an elastic body. The lens cover covers a lens of the camera when the lens cover unit is located at the first position, and exposes the lens when the lens cover unit is located at the second position. The elastic body is elastically deformable in a thickness direction of the display. The one protrusion, while the lens cover unit slides between the first position and the second position, presses an action part of the elastic body in the thickness direction to elastically displace the elastic body; and after the elastic displacement, the action part moves over the protrusion.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
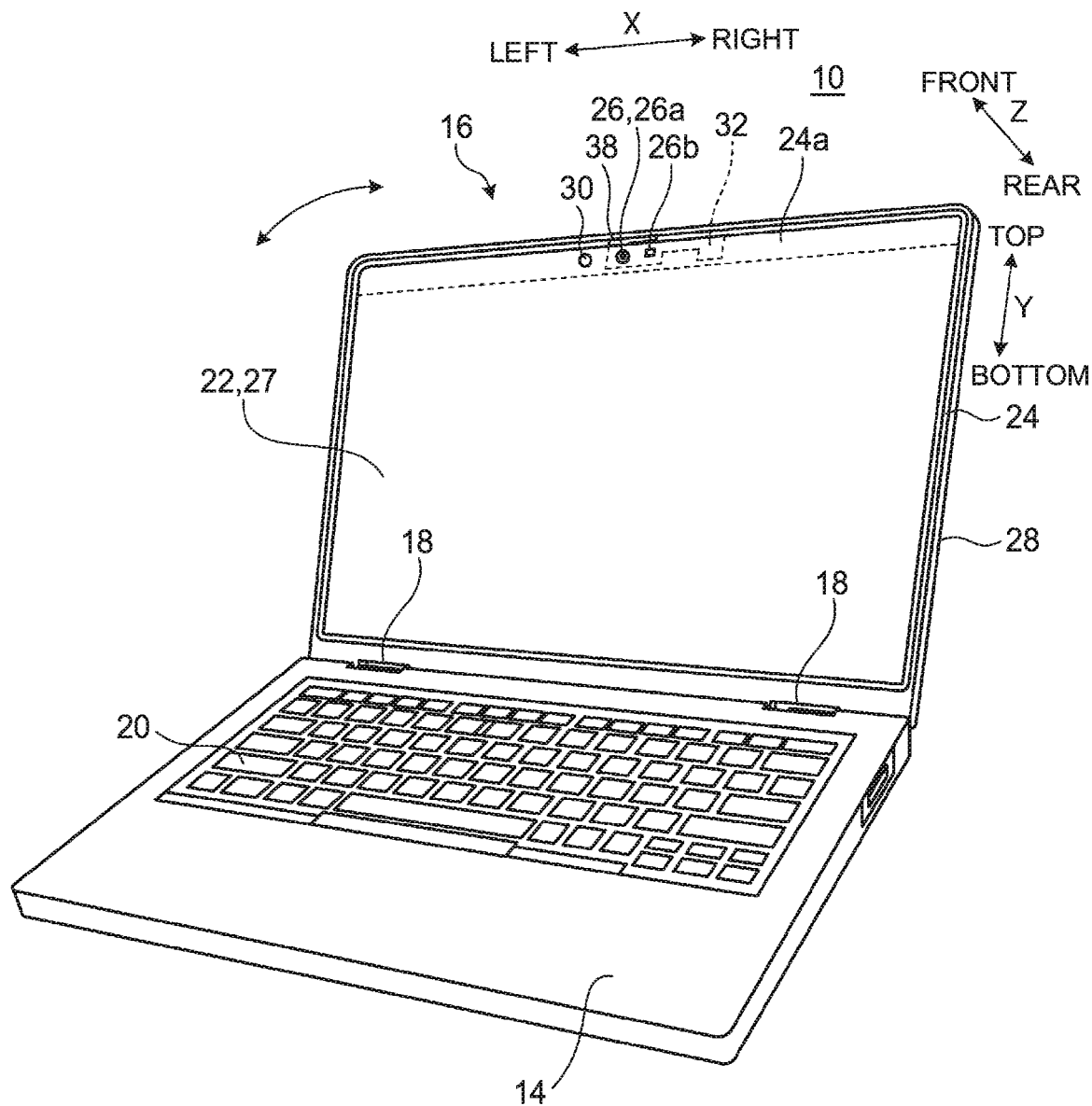
FIG. 1 is a perspective view of an electronic apparatus, according to one embodiment.

FIG. 1 is a perspective view of a laptop PC 10 that is an electronic apparatus according to one embodiment. The electronic apparatus is not limited to such a laptop PC 10, which may be a desktop PC, a mobile tablet, or a multi-functional mobile phone.

This laptop PC 10 includes a chassis 14 and a lid 16 that is openable/closable relative to the chassis 14 via hinges 18. The laptop PC with the lid 16 closed is compact and is suitable for mobile use. The upper face of the chassis 14 includes a keyboard 20.

The following may refer to the left-right direction of the lid 16 as X direction, the height direction of the lid 16 as Y direction, and the thickness direction of a display device 22 as Z direction. The direction where the display surface of the display device 22 and the surface of a frame 24, which will be described below, are directed will be referred to as front (forward), and the opposite direction will be referred to as rear (rearward).

The lid 16 includes the display device 22 that is disposed at the front face as the display surface, the frame 24 surrounding the display device 22, a camera 26 disposed at an upper frame 24a that is an upper side of the frame 24, the camera 26 shooting an image of the front, and a rear cover 28.

The display device 22 is a rectangular and thin color liquid crystal display, and occupies a major part of the front face of the lid 16. The frame 24 is narrow, which may be called a narrow bezel. A glass 27 is disposed on the front face of the display device 22. The glass 27 is rectangular. The glass 27 may be configured to enable a touch panel.

The camera 26 is a slim and horizontally long optical device that is disposed at a center part of the upper frame 24a of the frame 24. The camera 26 has a lens 26a at a center part, and has an indicator 26b on the right. An infrared port 30 is disposed on the left of the camera 26. The camera 26 and the infrared port 30 are directed to the front, i.e., to the user. The indicator 26b displays the operating state of the camera 26. The upper frame 24a comes with a lens cover unit 32 that is slidable along X direction between a first position and a second position in the frame 24. The lid 16 is thin in Z direction.

Figure 2A:
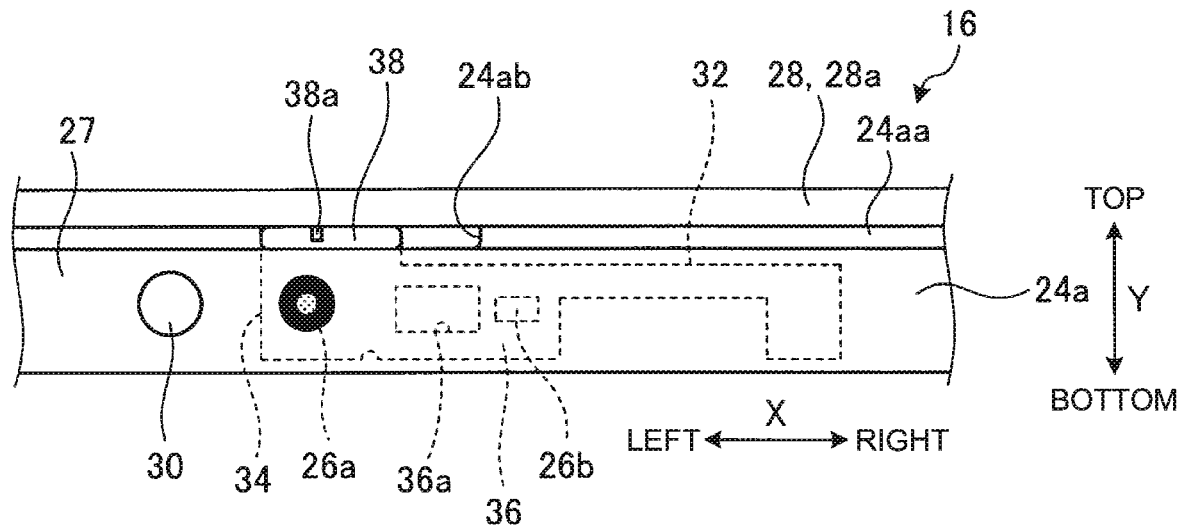
FIG. 2A illustrates the lens cover unit at a first position.
Figure 2B:
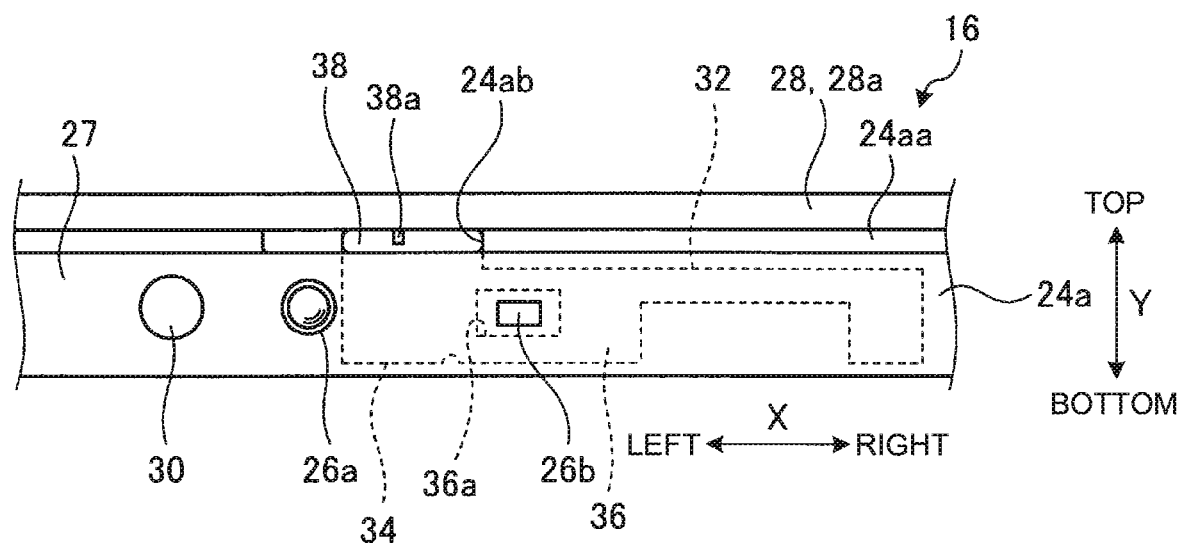
FIG. 2B illustrates the lens cover unit at a second position.

FIG. 2A illustrates the lens cover unit 32 at the first position, and FIG. 2B illustrates the lens cover unit 32 at the second position.

As illustrated in FIG. 2A, when the lens cover unit 32 having a lens cover 34 and an indicator cover 36 is at the first position on the left, the lens cover 34 covers the lens 26a from the front and the indicator cover 36 covers the indicator 26b from the front. In the lens cover unit 32, at least a part of the lens cover 34 and the indicator cover 36 are made of a material that does not transmit light. The lens cover 34 covering the lens 26a from the front prevents shooting by the camera 26 contrary to the user's intention and so gives a sense of ease to the user. The lens 26a covered with the lens cover 34 gives integrity with the frame 24 in terms of the design.

As illustrated in FIG. 2B, when the lens cover unit 32 moves to the second position on the right, the lens cover 34 also moves to a position that is displaced from the lens 26a, so that the lens 26a is exposed. The indicator cover 36 also moves to a position that is displaced from the indicator 26b, so that the indicator 26b is exposed through an exposure hole 36a. The camera 26 having the lens 26a exposed after the movement of the lens cover 34 is able to shoot an image.

The lens cover unit 32 has a knob 38 at the upper part. The user's operation with the knob 38 in X direction slides the lens cover unit 32 between the first position and the second position. The knob 38 has a cut-out 38a, which allows the user to operate the knob easily with a finger or a nail. The cut-out 38a is located just above the lens cover 34, so that the user is able to operate the knob 38 intuitively. The knob 38 is short in Y direction and extends in X direction.

The upper frame 24a has an upper part that is covered with a horizontally-long member 28a that is a part of the rear cover 28. The upper frame 24a has an intermediate member 24aa slightly protruding forward (see FIG. 3), and the intermediate member 24aa is disposed between the horizontally-long member 28a and the glass 27. The intermediate member 24aa is coplanar with the horizontally-long member 28a, the glass 27 and the knob 38 so as to have integral design. The intermediate member 24aa has the same height as the knob 38. The intermediate member 24aa has a cut-out 24ab. The knob 38 slides in X direction in a region between the horizontally-long member 28a and the glass 27 and in the range of the cut-out 24ab.

The intermediate member 24aa protects the surrounding of the glass 27. The intermediate member 24aa serves as the member to position the glass 27 for attachment (e.g., bonding), and this facilitates the assembly.

The lid 16 is assembled by firstly assembling the lens cover unit 32 with the frame 24, assembling the display device 22 with the frame 24, assembling the glass 27 with the frame 24 while using the intermediate member 24aa as the positioning member, and lastly attaching the rear cover 28 including the horizontally-long member 28a. The rear cover 28 of this electronic apparatus 10 does not relate to the mechanism including the lens cover unit 32.

Figure 3:
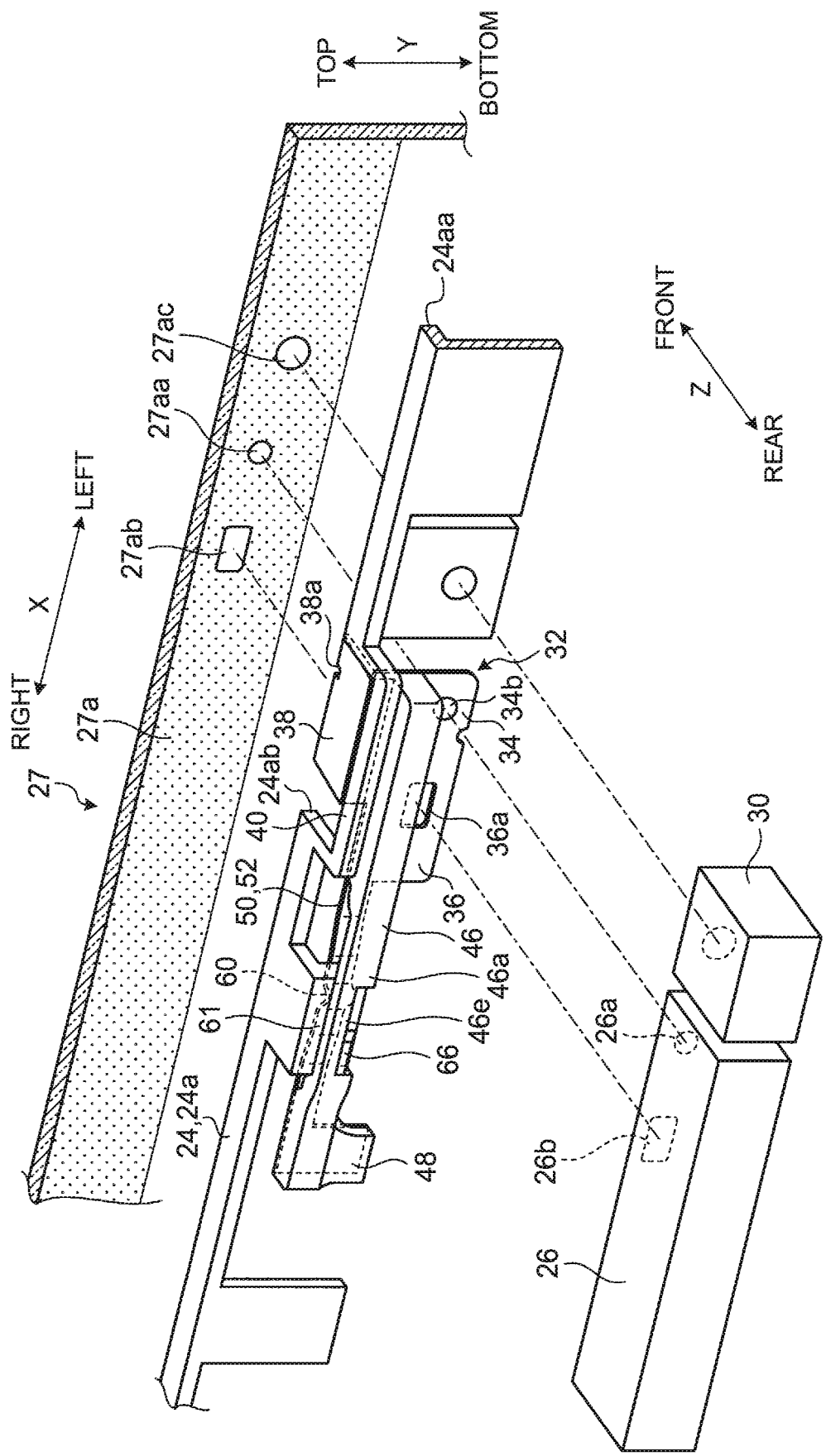
FIG. 3 is a partially enlarged and exploded perspective view of the lid viewed from the obliquely rearward.

FIG. 3 is a partially enlarged and exploded perspective view of the lid 16 viewed from the obliquely rearward. As illustrated in FIG. 3, the glass 27 has an upper colored part 27a to shield the frame 24. The drawing illustrates the colored part 27a with dots. Windows 27aa, 27ab, and 27ac are formed in the colored part 27a at three positions corresponding to the lens 26a, the indicator 26b, and the infrared port 30, respectively. These windows 27aa to 27ac are transparent parts without color.

The upper frame 24a of the frame 24 includes a guard 40 surrounding the knob 38 from three sides in plan view, and a protruding base 61. The guard 40 covers the knob 38 from the rear to expose the front face of the knob 38. The inside of the guard 40 defines the cut-out 24ab, which serves as a stopper for the sliding knob 38. Specifically when the knob 38 shifts to the "left" indicated with the arrow of FIG. 3 to come in contact with one end of the guard 40, the lens cover unit 32 is at the first position. When the knob 38 shifts to the "right" to come in contact with the other end of the guard 40, the lens cover unit 32 is at the second position. The protruding base 61 is described later.

Figure 4:
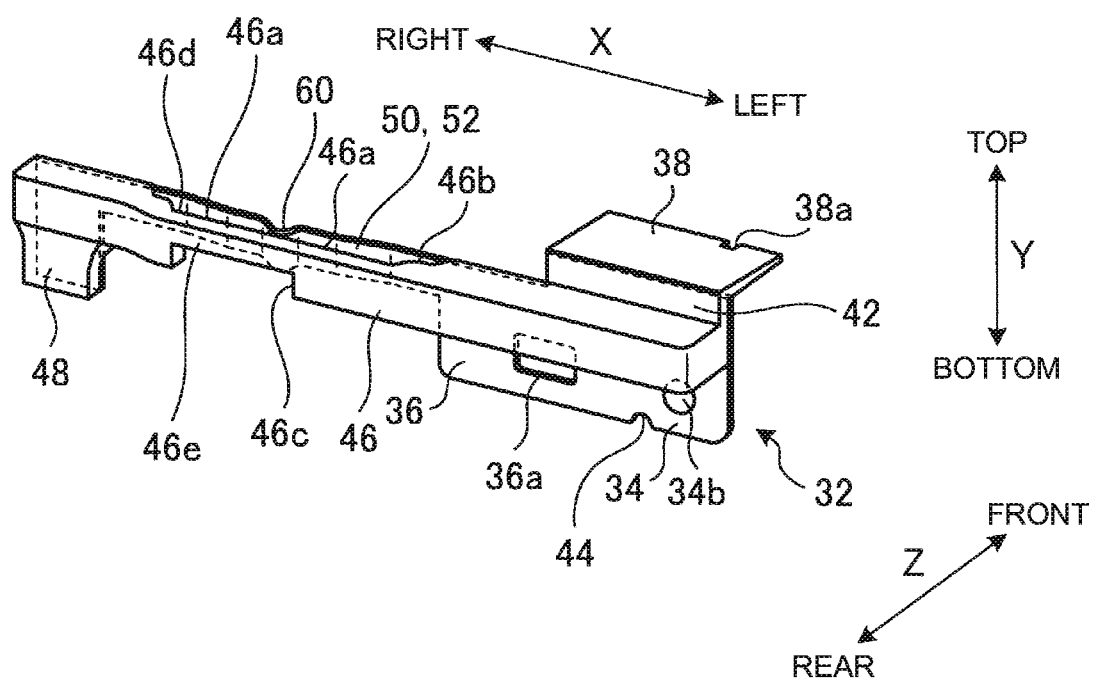
FIG. 4 is a perspective view of the lens cover unit viewed from the obliquely rearward.
Figure 5:
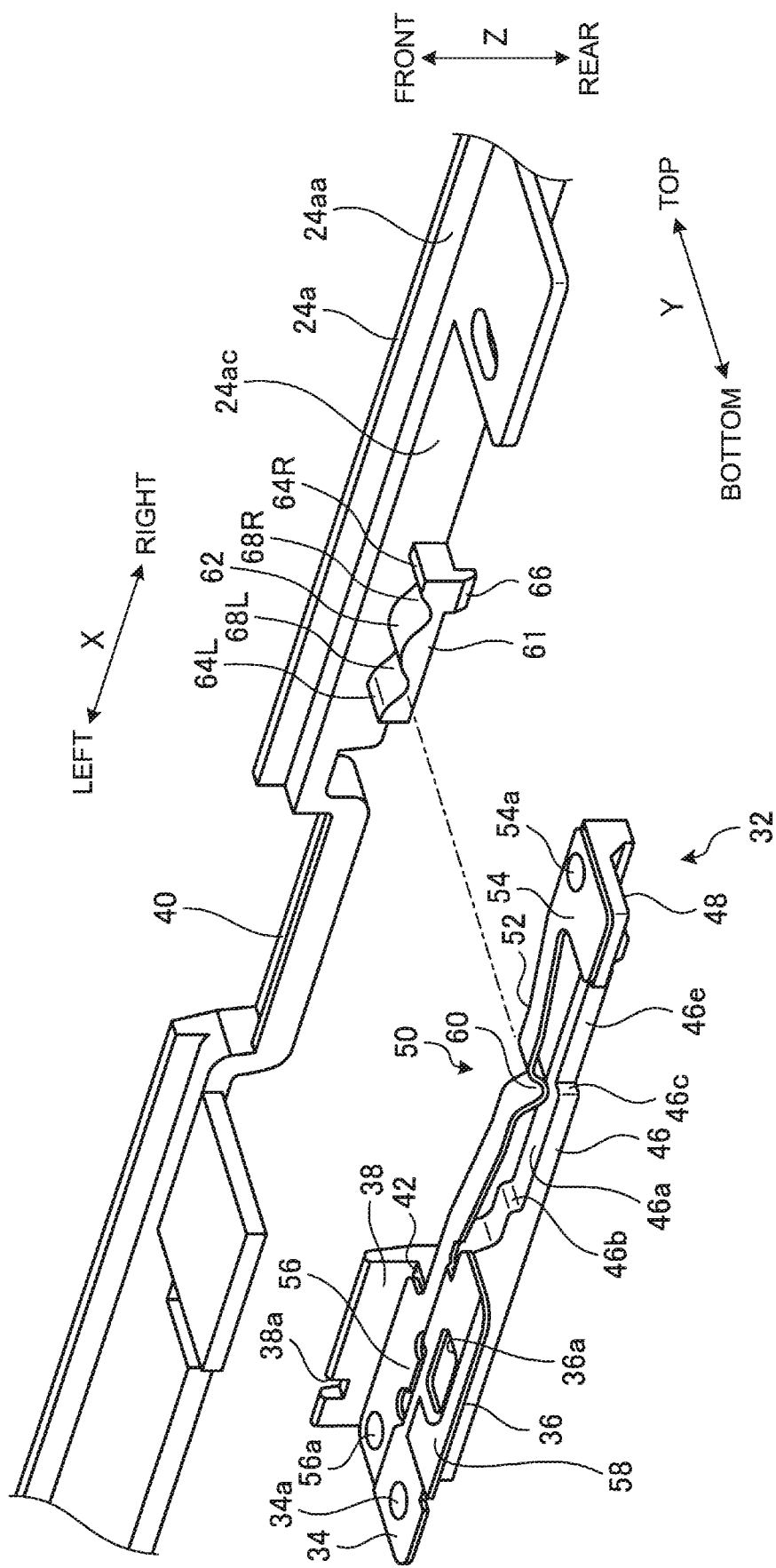
FIG. 5 is an exploded perspective view of the lens cover unit and the upper frame viewed from the obliquely front and downward.

FIG. 4 is a perspective view of the lens cover unit 32 viewed from the obliquely rearward. FIG. 5 is an exploded perspective view of the lens cover unit 32 and the upper frame 24a viewed from the obliquely front and downward. As illustrated in FIG. 4 and FIG. 5, the lens cover unit 32 includes a base plate 42. The knob 38 as stated above protrudes forward from the upper end of the base plate 42, and the lens cover 34 and the indicator cover 36 as stated above extend integrally downward from the lower end of the base plate 42. The lens cover 34 and the indicator cover may not be integrated with the lens cover 32 as long as they are fixed to the lens cover unit 32. The base plate 42 is a small plate having the thickness direction in Z direction and defining a plane extending in X-Y direction. The base plate 42, the lens cover 34 and the indicator cover 36 have the same thickness, and are coplanar with each other.

The lens cover 34 is a plate having an area sufficient to cover the lens 26a. The lens cover 34 has a small hole 34a.

Seal 34b is applied to the rear face of the lens cover 34 so as not to transmit light. The seal 34b on the rear face is visible from the front face through the small hole 34a. The seal 34b is red, for example. When the lens cover 34 covers the lens 26a, the user confirms the shielding state with the color of the seal 34b.

The indicator cover 36 is a plate that continuously extends to the right from the lens cover 34, and has an exposure hole 36a at a center part. The exposure hole 36a is to expose the indicator 26b, and a part of the indicator cover 36 on the "right" of the exposure hole 36a covers the indicator 26b. The plate has a small cut-out 44 between the lens cover 34 and the indicator cover 36 and below them.

The lens cover unit 32 also has an arm 46 extending from the base plate 42 to the "right," a fixing plate 48 disposed at the extending end of the arm 46, and a metal plate 50 having both ends fixed to the arm 46. The metal plate 50 is made of stainless steel, for example.

The arm 46 extends substantially linearly in X direction along the upper frame 24a. The arm 46 has a step 46b on the front face close to the "left" end and a step 46d on the front face close to the "right" end so as to define a shallow recessed portion 46a on the front. The arm 46 has a step 46c on the lower face, and a part on the "right" of the step 46c defines a linear part 46e. The fixing plate 48 is a small plate extending downward from the extending end of the arm 46.

As illustrated in FIG. 5, the metal plate 50 has a center blade sprint 52, a right-end fixed part 54, and a left-end fixed part 56. The right-end fixed part 54 is a plate overlapping with the fixing plate 48 and having the same shape as the fixing plate 48, and is positioned and fixed by swaging 54a. The left-end fixed part 56 is a plate overlapping with the base plate 42, the lens cover 34, and the indicator cover 36 and having the same shape as these parts, and is positioned and fixed by swaging 56a. The left-end fixed part 56 has holes to expose the small hole 34a and the exposure hole 36a. A L-letter shaped thin tape 58 is attached to the left-end fixed part 56 at a part between the exposure hole 36a and the "lower" end and a part on the "left" of the exposure hole 36a. This tape 58 enables smooth sliding of the metal plate 50 relative to the glass 27 (see FIG. 3), so that the metal plate 50 does not damage the glass 27. The part between the exposure hole 36a and the lower end gives a longer face in X direction to attach the tape 58, and so prevents the damage of the glass 27 better.

The blade spring 52 is integral with the right-end fixed part 54 and the left-end fixed part 56, which may be prepared by punching a single plate member, for example. Both ends of the blade spring 52 are securely fixed to the arm 46 with the right-end fixed part 54 and the left-end fixed part 56 each having an appropriate area. The blade spring 52 has a bent (action part) 60 at a center part, the bent protruding rearward. The bent 60 has a mountain-like shape in plan view. The blade spring 52 has a width in Y direction that is substantially equal to the width of the arm 46 in Y direction. The blade spring 52 has a width in Z direction that is moderately thin and is elastic. This means that the bent 60 is elastically displaceable in Z direction. The blade spring 52 has a curved shape that is slightly convex rearward so as to enable bending deformation during the elastic deformation in Z direction. This means that the blade spring 52 hardly shows elongation deformation due to stretching during the elastic deformation in Z direction.

The protruding base 61 protrudes from the upper frame 24a at a part slightly to the "right" from the guard 40. The protruding base 61 protrudes downward from the ceiling face 24ac. In this embodiment, the protruding base 61 is integral with the upper frame 24a. In another embodiment, a separate member may be fixed to the upper frame 24a. The protruding base 61 has a protrusion 62 protruding forward, two auxiliary protrusions 64L and 64R, and a small retainer 66 protruding rearward from the lower end. The protrusion 62 has a mountain-like shape that protrudes forward from a center part of the protruding base 61. The protrusion 62 has a height in Z direction that is substantially equal to the height of the bent 60 in Z direction. The height of the protrusion 62 is set so as to allow the bent 60 to move over the protrusion 62 while deforming in Z direction when the lens cover unit 32 slides in X direction.

The auxiliary protrusion 64L is on the left of the protrusion 62, and the auxiliary protrusion 64R is on the right of the protrusion 62. A first recessed portion 68L is defined between the auxiliary protrusion 64L and the protrusion 62, and a second recessed portion 68R is defined between the auxiliary protrusion 64R and the protrusion 62.

Figure 6:
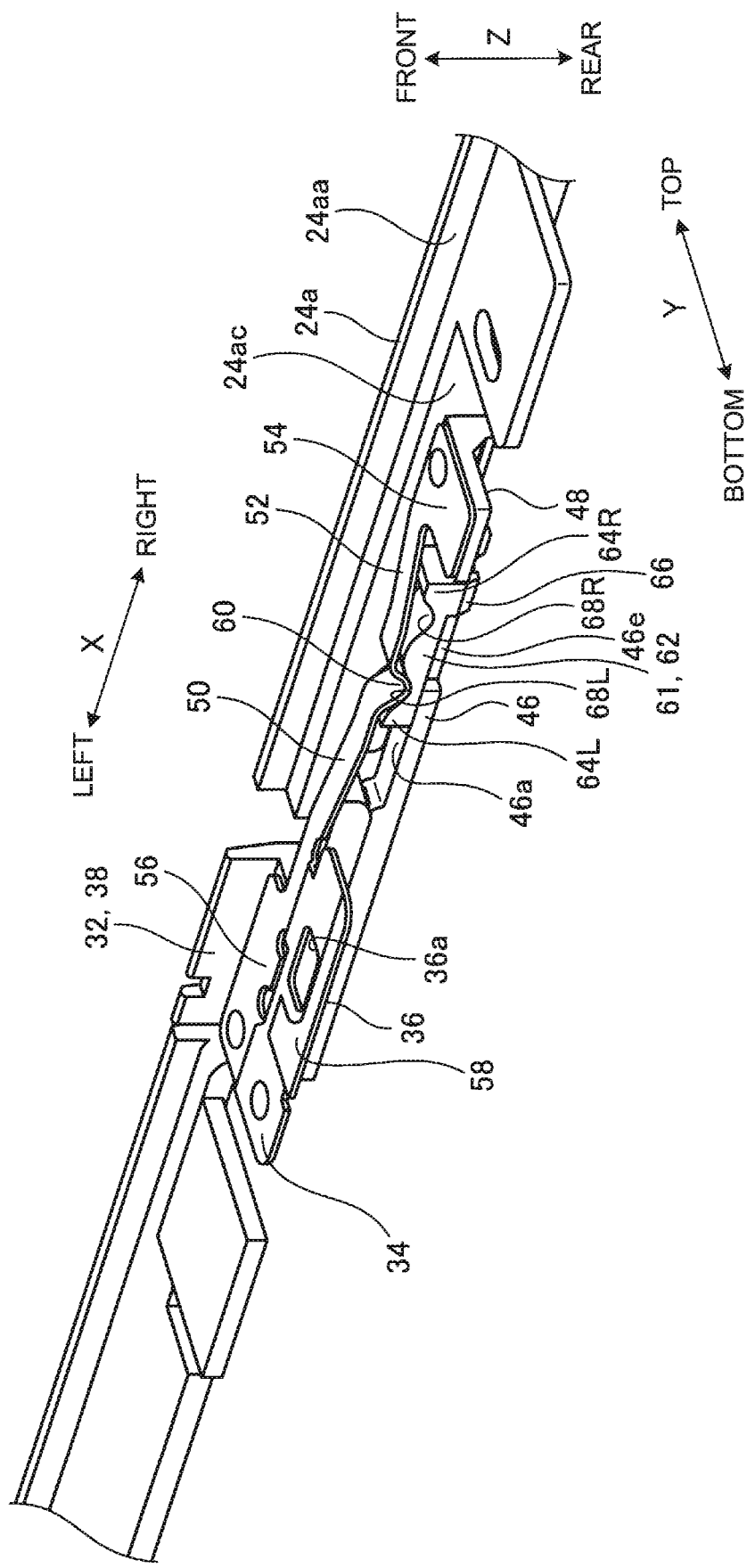
FIG. 6 is a perspective view of the lens cover unit and the upper frame that are assembled and viewed from the obliquely front and downward.

FIG. 6 is a perspective view of the lens cover unit 32 and the upper frame 24a that are assembled and viewed from the obliquely front and downward. As illustrated in FIG. 6, the arm 46 and the blade spring 52 that are assembled are along the upper frame 24a so that they hardly have a gap with the ceiling face 24ac of the upper frame 24a. In the assembled state, the protrusion 62 and the auxiliary protrusions 64L and 64R of the protruding base 61 are disposed between the blade spring 52 and the arm 46.

The retainer 66 holds the linear part 46e of the arm 46 from the below so as to prevent falling of the linear part 46e downward, and also serves as a guide for the lens cover unit 32 when the lens cover unit 32 slides in X direction. The protruding base 61 is sandwiched between the bent 60 of the blade spring 52 and the recessed portion 46a of the arm 46 without gap. This brings the recessed portion 46a into contact with the rear face of the protruding base 61, and the recessed portion 46a therefore is positioned in Z direction and is guided in X direction by the protruding base 61. To assemble the lens cover unit 32 with the upper frame 24a, the user may elastically deform the blade spring 52 forward so as to widen the gap with the arm 46, and put the protruding base 61 and the retainer 66 into the gap. In the assembled state, the guard 40 surrounds the knob 38 (see FIG. 3).

The lens cover unit 32 is assembled in this way with the upper frame 24a, and this avoids detachment of the lens cover unit 32 in any direction in absence of the display device 22 and the glass 27. This allows the user to easily handle the frame 24 assembled with the lens cover unit 32 at steps before attaching the display device 22 and the glass 27 to the frame 24. The structure without the retainer 66 also prevents detachment of the lens cover unit 32 at least in Z direction as long as the protruding base 61 is disposed between the blade spring 52 and the arm 46.

Figure 7A:
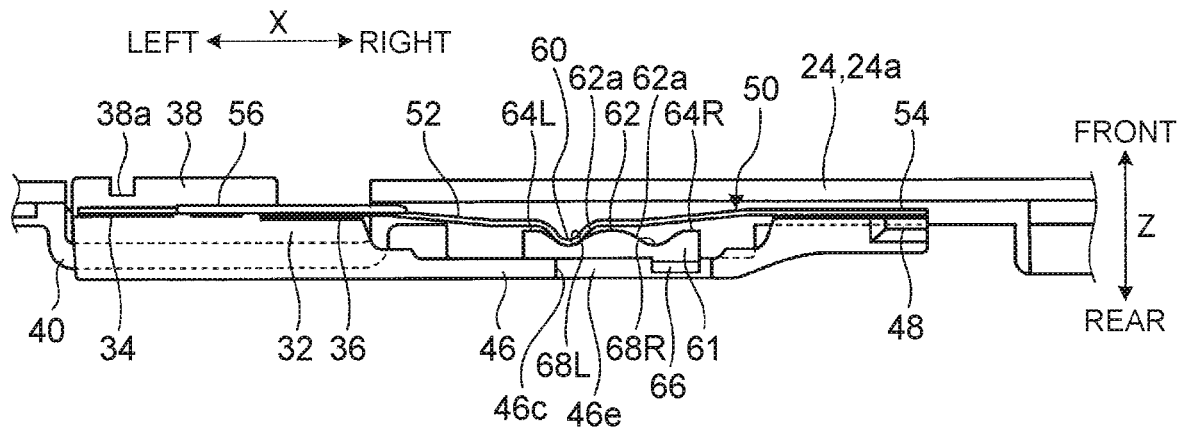
FIG. 7A illustrates the lens cover unit at the first position.
Figure 7B:
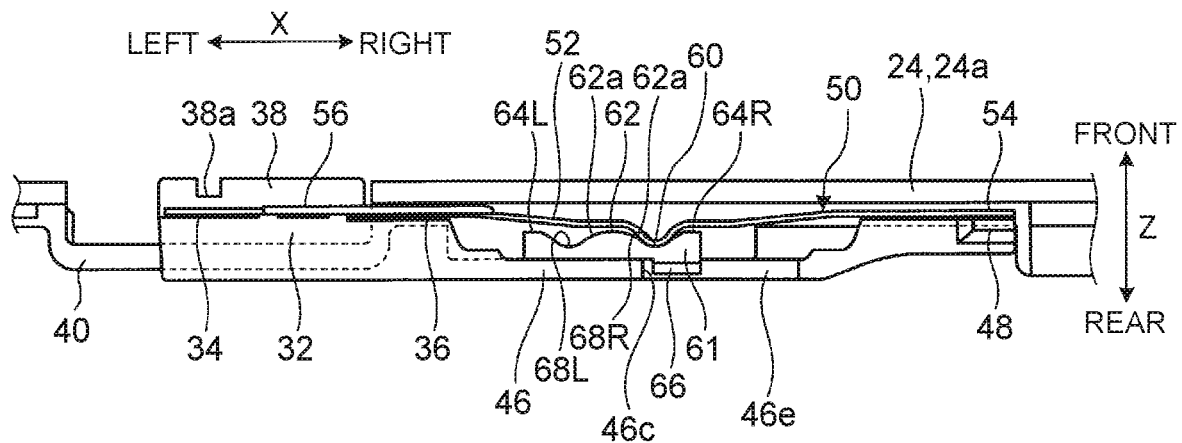
FIG. 7B illustrates the lens cover unit at the second position.
Figure 7C:
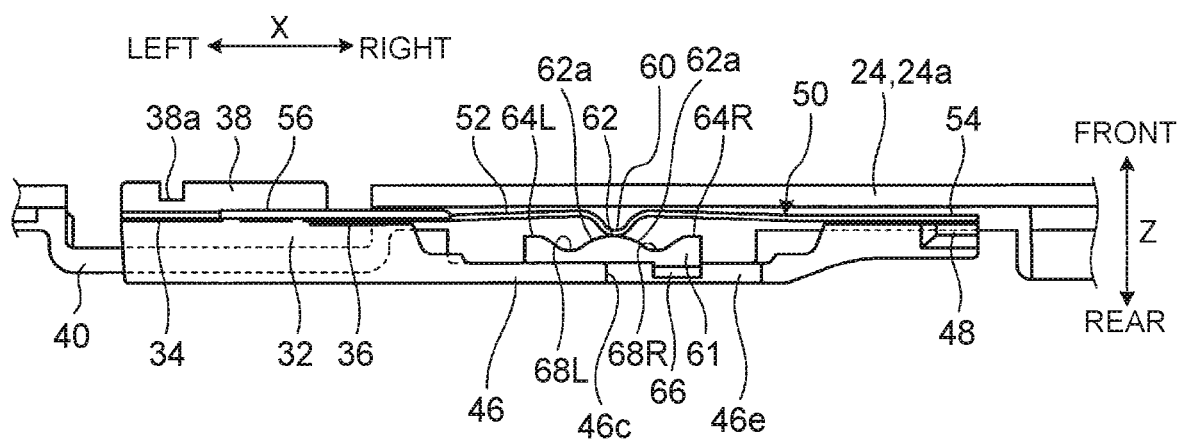
FIG. 7C illustrates the lens cover unit between the first position and the second position.

FIGS. 7A-7C are bottom views of the lens cover unit 32 and the upper frame 24a that are assembled and viewed from the below. FIG. 7A illustrates the lens cover unit 32 at the first position, FIG. 7B illustrates the lens cover unit 32 at the second position, and FIG. 7C illustrates the lens cover unit 32 located between the first position and the second position.

As illustrated in FIG. 7A, when the lens cover unit 32 is at the first position, the bent 60 fits into the first recessed portion 68L. As illustrated in FIG. 7B, when the lens cover unit 32 is at the second position, the bent 60 fits into the second recessed portion 68R. The first recessed portion 68L and the second recessed portion 68R each have shapes to receive the bent 60 for fitting.

When the lens cover unit 32 slides between the first position and the second position, the protrusion 62 presses the bent 60 forward to elastically deform the blade spring 52 as illustrated in FIG. 7C. After that, the bent 60 moves over the protrusion 62. This enables positioning of the lens cover unit 32 at any one of the first position and the second position in X direction, so that the lens cover unit 32 does not move easily due to gravity or vibrations. The user feels a favorable sense of clicking when they slide the lens cover unit 32 in X direction and is able to confirm the operation. The lens cover unit 32 may be configured to generate clicking sound during sliding between the first position and the second position.

When the lens cover unit 32 is at the first position or at the second position, the bent 60 is in contact with a base 62a on either the left or the right of the protrusion 62, and is moderately biased forward. That is, the blade spring 52 receives pretension. This prevents rattling because of no gap between the protrusion 62 and the protruding base 61, and allows the bent 60 to generate a specified load when the bent 60 moves over the protrusion 62. The base 62a of the protrusion 62 includes the inclined faces on both sides of the protrusion 62 as well as the bottoms of the first recessed portion 68L and the second recessed portion 68R.

When the bent 60 moves over the protrusion 62 (see FIG. 7C), the arm 46 is biased to move forward because of a reactive force such that the protrusion 62 presses the bent 60. Since the protruding base 61 is sandwiched between the bent 60 and the arm 46, the arm 46 does not bend forward. The lens cover unit 32 therefore keeps the correct posture, and the protrusion 62 securely presses the bent 60 with a specific amount and a specified load.

In the electronic apparatus 10 having such a configuration, the bent 60 of the blade spring 52 in the lens cover unit 32 is elastically displaceable forward. The electronic apparatus 10 is configured so that, when the lens cover unit 32 slides between the first position and the second position, the bent 60 of the blade spring 52 elastically moves in Z direction due to the protrusion 62, and after that, the bent 60 moves over the protrusion 62. That is, the space to allow for the movement of the blade spring 52 during the elastic deformation is required only in Z direction and not in Y direction, and this reduces the dimension of the lens cover unit 32 and the region to accommodate the lens cover unit 32 in Y direction. This enables further reduction in the width in Y direction of the upper frame 24a of the frame 24.

Figure 8C:
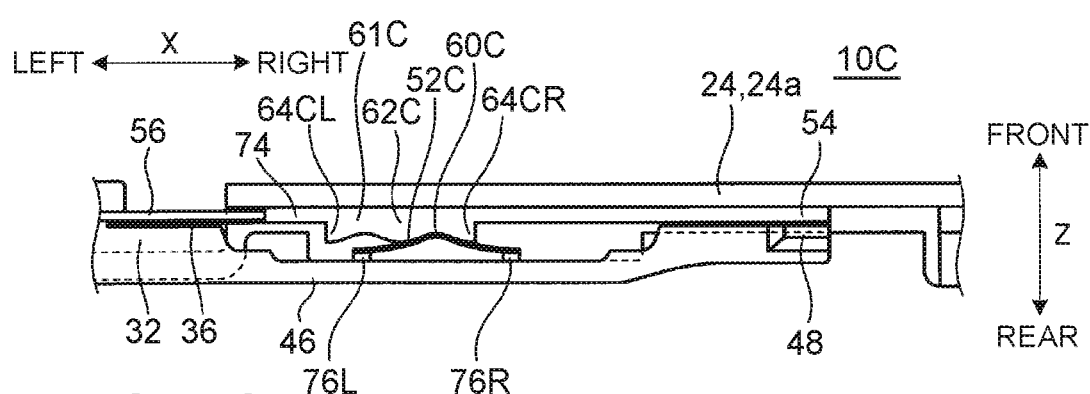
FIG. 8C illustrates an electronic apparatus according to a third modified example.
Figure 9A:
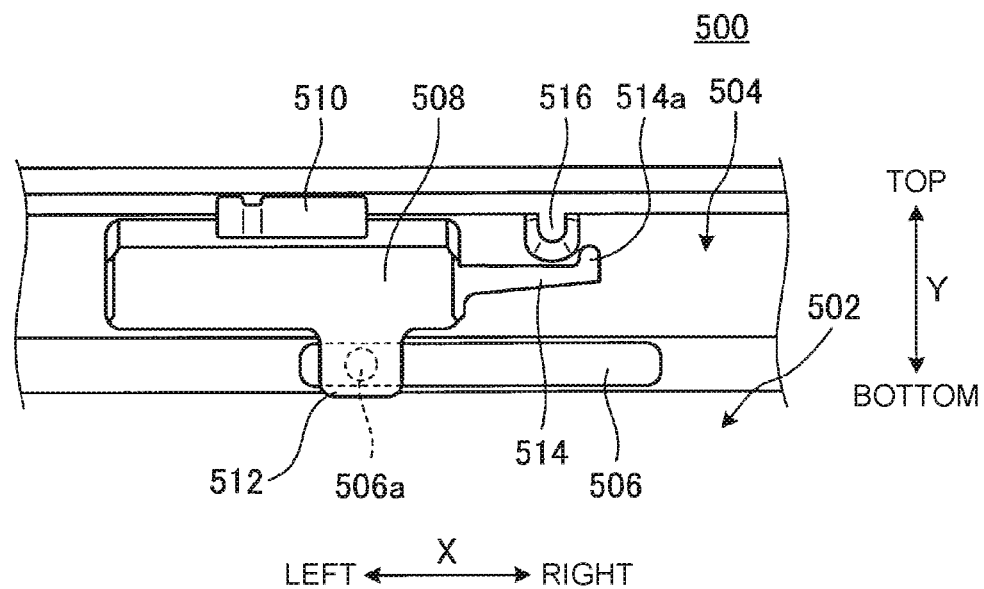
FIG. 9A illustrates a lens of a camera that is covered.
Figure 9B:
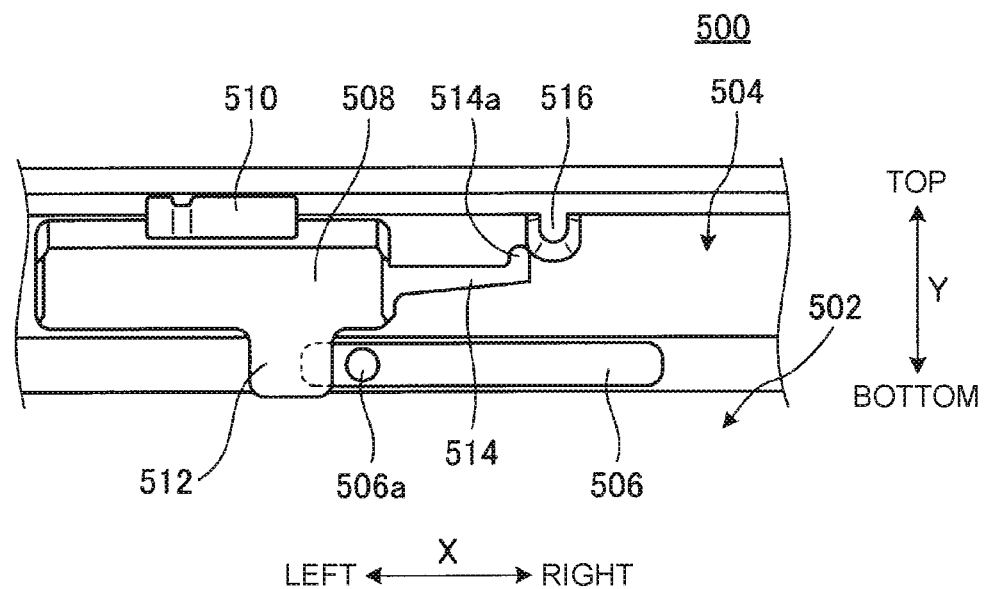
FIG. 9B illustrates the lens that is exposed.

Unlike a cantilever type as in the elastic body 514 illustrated in FIG. 9 as a comparative example, the blade spring 52 is fixed at both ends to the arm 46, and this allows the blade spring 52 to be thin. Such a thin blade spring 52 still generates a sufficient elastic reactive force, and the width of the lens cover unit 32 in Z direction therefore can be set narrow. The same goes for a blade spring 52C (see FIG. 8C) and the like described later. The bent 60 as an action part of the blade spring 52 can be easily formed by bending.

The protruding base 61 including the protrusion 62 is integral with the frame 24, and this reduces the number of components. The protruding base 61 is disposed between the blade spring 52 and the arm 46, and the lens cover unit 32 therefore does not fall off in Z direction during assembly process. The retainer 66 holds the linear part 46e of the arm 46, and the lens cover unit 32 therefore does not fall off in Y direction.

When the lens cover unit 32 is at the first position, the bent 60 fits into the first recessed portion 68L, and when the lens cover unit 32 is at the second position, the bent 60 fits into the second recessed portion 68R. In this way, the lens cover unit 32 at these positions is positioned correctly.

To give a user a sense of clicking during sliding of the lens cover unit 32 between the first position and the second position, the protrusion 62 of the protruding base 61 suffices. The auxiliary protrusions 64L and 64R therefore may be omitted depending on design conditions. When the auxiliary protrusions 64L and 64R are omitted, the lens cover unit 32 can be positioned at the first position or the second position based on a contact between the walls of the knob 38 and the guard 40.

The indicator cover 36 enables shielding and exposure of the indicator 26b in synchronization with the shielding and exposure of the lens 26a.

Figure 8A:
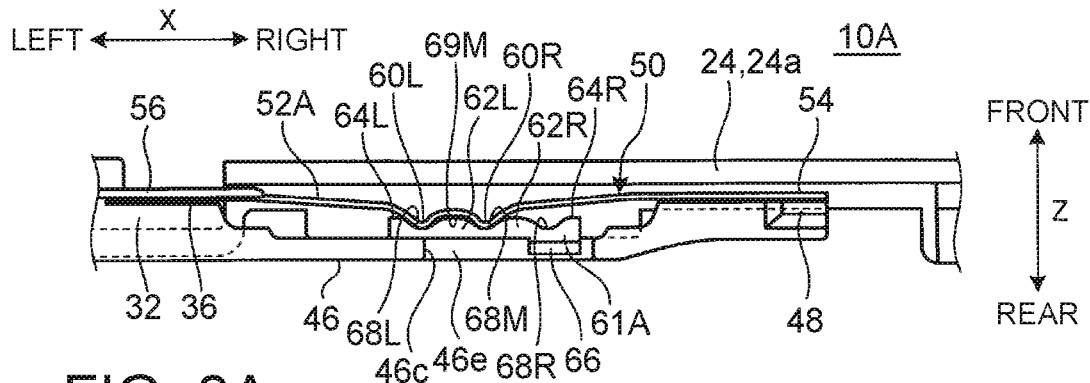
FIG. 8A illustrates an electronic apparatus according to a first modified example.
Figure 8B:
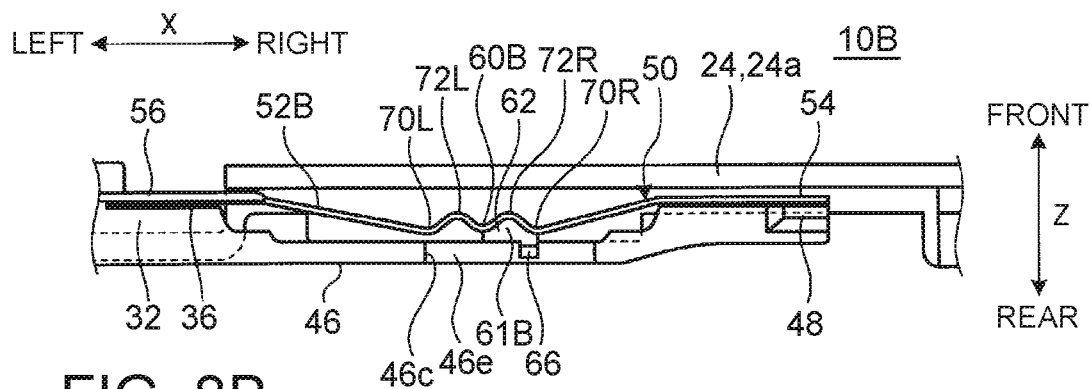
FIG. 8B illustrates an electronic apparatus according to a second modified example.
Figure 8D:
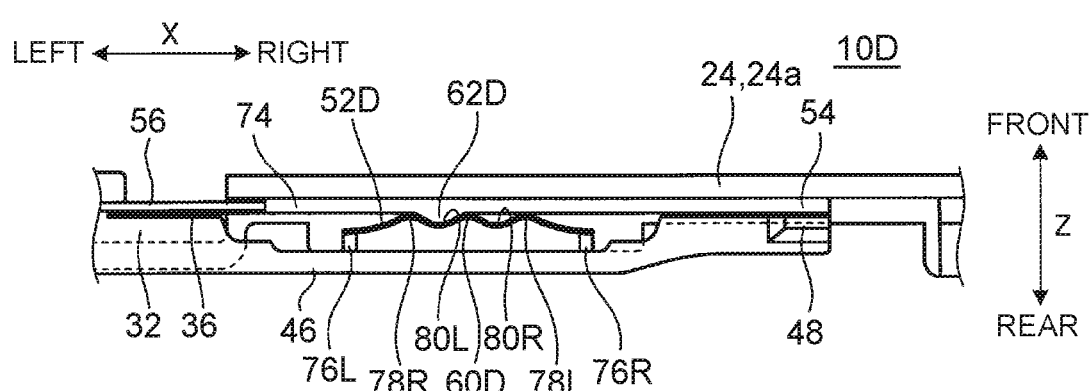
FIG. 8D illustrates an electronic apparatus according to a fourth modified example.

FIGS. 8A-8D are bottom views of the lens cover unit 32 and the upper frame 24a of an electric apparatus according to modified examples that are assembled and viewed from the below. FIG. 8A illustrates an electronic apparatus 10A according to a first modified example, FIG. 8B illustrates an electronic apparatus 10B according to a second modified example, FIG. 8C illustrates an electronic apparatus 10C according to a third modified example, and FIG. 8D illustrates an electronic apparatus 10D according to a fourth modified example. In each of FIG. 8A to FIG. 8D, the lens cover unit 32 is at a first position. For these electronic apparatuses 10A to 10D, like numbers indicate like components in the electronic apparatus 10 as stated above, and their detailed descriptions are omitted. The same goes for the components of the electronic apparatuses 10A to 10D. The following represents a component corresponding to that of the electronic apparatus 10 by assigning the number and the corresponding letter A, B, C or D to the component.

As illustrated in FIG. 8A, the lens cover unit 32 in the electronic apparatus 10A includes a blade spring 52A instead of the blade spring 52 as stated above. The blade spring 52A has two bents 60L and 60R. These bents 60L and 60R are disposed instead of the bent 60 as stated above, and have the protruding amount in Z direction smaller than that of the bent 60. An intermediate recessed portion 69M is defined between the two bents 60L and 60R.

The upper frame 24a of the electronic apparatus 10A includes a protruding base 61A instead of the protruding base 61 as stated above. The protruding base 61A includes two protrusions 62L and 62R. These protrusions 62L and 62R are disposed instead of the protrusion 62 as stated above, and have the protruding amount in Z direction smaller than that of the protrusion 62. The intermediate recessed portion 68M is defined between the two protrusions 62L and 62R. An auxiliary protrusion 64L is on the left of the protrusion 62L, and an auxiliary protrusion 64R is on the right of the protrusion 62R.

When the lens cover unit 32 of the electronic apparatus 10A is at the first position (as in FIG. 8A), the bent 60L fits into the first recessed portion 68L, the bent 60R fits into the intermediate recessed portion 68M, and the protrusion 62L fits into the intermediate recessed portion 69M. When the lens cover unit 32 is at the second position (not illustrated), the bent 60L fits into the intermediate recessed portion 68M, the bent 60R fits into the second recessed portion 68R, and the protrusion 62R fits into the intermediate recessed portion 69M.

Such an electronic apparatus 10A is configured so that the two bents 60L and 60R, the two protrusions 62L and 62R and the auxiliary protrusions 64L and 64R allow the blade spring 52A and the protruding base 61A to engage at a plurality of positions, and so enables more secure positioning of the lens cover unit 32. When the lens cover unit 32 slides in X direction, the two protrusions 62L and 62R push out the two bents 60L and 60R in Z direction. In this way the pressing force is distributed, and the heights in Z direction of these bents 60L and 60R and the protrusions 62L and 62R are kept small. This reduces the width in Z direction of the blade spring 52A and the arm 46 in the lens cover unit 32. The number of the bents of the blade spring and the protrusions of the protruding base 61 may be three or more, as long as a plurality of bents and a plurality of protrusions are disposed alternately with intervals in X direction.

As illustrated in FIG. 8B, the electronic apparatus 10B includes a blade spring 52B instead of the blade spring 52 as stated above, and includes a protruding base 61B instead of the protruding base 61 as stated above. The blade spring 52B is disposed at the lens cover unit 32, and the protruding base 61B is disposed at the upper frame 24a. The blade spring 52B has a bent 60B at a center part and two auxiliary bents 70L and 70R on the left and right. A first recessed portion 72L is defined between the auxiliary bent 70L and the bent 60B, and a second recessed portion 72R is defined between the auxiliary bent 70R and the bent 60B. Similarly to the protruding base 61 as stated above, the protruding base 61B has a protrusion 62, and does not have auxiliary protrusions 64L and 64R.

When the lens cover unit 32 of the electronic apparatus 10B is at the first position (as in FIG. 8B), the protrusion 62 fits into the second recessed portion 72R. When the lens cover unit 32 is at the second position (not illustrated), the protrusion 62 fits into the first recessed portion 72L.

As illustrated in FIG. 8C, the lens cover unit 32 in the electronic apparatus 10C includes an arm 74. The arm 74 is disposed forward relative to the arm 46 as stated above, and extends in X direction in parallel with the arm 46 to connect a right-end fixed part 54 and a left-end fixed part 56. Similarly to the arm 46, the arm 74 is a rigid body.

The electronic apparatus 10C includes a blade spring 52C instead of the blade spring 52 as stated above, and includes a protruding base 61C instead of the protruding base 61 as stated above. The protruding base 61C is disposed at the arm 74. The protruding base 61C has a protrusion 62C and auxiliary protrusions 64CL, 64CR. These protrusion 62C and auxiliary protrusions 64CL and 64CR correspond to the protrusion 62 and the auxiliary protrusions 64L and 64R as stated above, and protrude rearward. That is, the protruding base 61C has the same shape as the protruding base 61 as stated above, and is turned backward.

The blade spring 52C extends in X direction, and both ends of the blade spring 52C are fixed to two posts 76L and 76R protruding from the upper frame 24a. The blade spring 52C and the posts 76L and 76R are fixed by welding, for example. The blade spring 52C has a bent 60C. The bent 60C corresponds to the bent 60 as stated above, and protrudes forward. That is, the blade spring 52C has the same shape as the blade spring 52 as stated above, and is turned backward.

In this way the electronic apparatus 10C is configured so as to conceptually exchange the components in the electronic apparatus 10 between the blade spring 52 as the elastic body and the protruding base 61 as the rigid body. As is clear from a comparison between the electronic apparatus 10 and the electronic apparatus 10C and a comparison between the electronic apparatus 10B and an electronic apparatus 10D described later, the blade spring as the elastic body, which is used for positioning of the lens cover unit 32 at the first position or the second position, may be fixed to one of the lens cover unit 32 and the frame 24, and the protrusion of the rigid body may be fixed to the other. The elastic body disposed at the frame 24 facilitates the adjustment of the dimensions. The elastic body disposed at the lens cover unit 32 eliminates the elastic body at the frame 24, and so reduces the cost. This also facilitates the fixing process of the elastic body.

The elastic body and the rigid body as stated above refer to relative properties, and the rigid body may have elasticity just slightly.

As illustrated in FIG. 8D, the lens cover unit 32 in the electronic apparatus 10D includes an arm 74 similarly to the electronic apparatus 10C. The arm 74 includes a protrusion 62D that protrudes rearward. The electronic apparatus 10D includes a blade spring 52D instead of the blade spring 52 as stated above. The blade spring 52D extends in X direction, and both ends of the blade spring 52D are fixed to two posts 76L and 76R protruding from the upper frame 24a.

The blade spring 52D has a bent 60D at a center part and two auxiliary bents 78L and 78R on the left and right. A first recessed portion 80L is defined between the auxiliary bent 78L and the bent 60D, and a second recessed portion 80R is defined between the auxiliary bent 78R and the bent 60D.

The bent 60D and the auxiliary bents 78L and 78R correspond to the bent 60B and the auxiliary bents 70L and 70R as stated above, and protrude forward. That is, the blade spring 52D has the same shape as the blade spring 52B as stated above, and is turned backward.

In this way the electronic apparatus 10D is configured so as to conceptually exchange the components in the electronic apparatus 10B between the blade spring 52B as the elastic body and the protruding base 61B as the rigid body.

The blade springs 52, 52A to 52D as stated above may be other elastic bodies, such as a metal spring pin, depending on design conditions.

As has been described, the present invention provides an electronic apparatus having an improved lens cover.

While the invention has been particularly shown and described with reference to a preferred embodiment, it will be understood by those skilled in the art that various changes in form and detail may be made therein without departing from the spirit and scope of the invention.

What is claimed is:
1. An electronic apparatus comprising:
    a display;
    a frame surrounding said display;
    a camera disposed in said frame;
    a lens cover unit slidable between a first position and a second position in said frame, wherein said lens cover unit includes
        a lens cover covers a lens of said camera when said lens cover unit is located at said first position and exposes said lens when said lens cover unit is located at said second position;
        an arm extending in a sliding direction of said lens cover unit; and
        an elastic body, fixed to one of said lens cover unit and said frame, is elastically deformable in a thickness direction of said display, wherein said elastic body includes a metal plate extending in said sliding direction, and has both ends fixed to said arm; and
    at least one protrusion, while said lens cover unit slides between said first position and said second position, presses at least one action part of said elastic body in said thickness direction to elastically displace said elastic body, and after said elastic displacement, said at least one action part moves over said at least one protrusion.

2. The electronic apparatus of claim 1, wherein said at least one protrusion is disposed at a protruding base integral with said frame, and said protruding base is disposed between said elastic body and said arm.

3. The electronic apparatus of claim 2, wherein said protruding base is sandwiched between said elastic body and said arm.

4. The electronic apparatus of claim 2, wherein said at least one action part is a bent of said metal plate that protrudes in one direction along said thickness direction.

5. The electronic apparatus of claim 4, wherein said at least one protrusion protrudes in said other direction along said thickness direction.

6. The electronic apparatus of claim 1, wherein when said lens cover unit is at said first position or at said second position, said at least one action part is in contact with a base of said at least one protrusion.

7. The electronic apparatus of claim 1, wherein said at least one action part includes a plurality of action parts that are disposed in a sliding direction of said lens cover unit, and said at least one protrusions includes a plurality of protrusions disposed in said sliding direction.

8. The electronic apparatus of claim 7, wherein said plurality of action parts and said plurality of protrusions are alternately disposed in said sliding direction.

9. The electronic apparatus of claim 1, wherein said camera includes an indicator indicating an operating state of said camera.

10. The electronic apparatus of claim 9, wherein said lens cover unit includes an indicator cover that is disposed at a position covering said indicator from said front when said lens cover unit is at said first position, and is disposed at a position displaced from said indicator when said lens cover unit is at said second position.

11. An electronic apparatus comprising:
a display;
a frame surrounding said display;
a camera disposed in said frame;
a lens cover unit slidable between a first position and a second position in said frame, wherein said lens cover unit includes
a lens cover covers a lens of said camera when said lens cover unit is located at said first position and exposes said lens when said lens cover unit is located at said second position; and
an elastic body, fixed to one of said lens cover unit and said frame, is elastically deformable in a thickness direction of said display, wherein said elastic body includes a metal plate extending in a sliding direction of said lens cover unit, and has both ends fixed to two posts protruding from said frame; and
at least one protrusion, while said lens cover unit slides between said first position and said second position, presses at least one action part of said elastic body in said thickness direction to elastically displace said elastic body, and after said elastic displacement, said at least one action part moves over said at least one protrusion.

12. An electronic apparatus comprising:
a display;
a frame surrounding said display;
a camera disposed in said frame;
a lens cover unit slidable between a first position and a second position in said frame, wherein said lens cover unit includes
a lens cover covers a lens of said camera when said lens cover unit is located at said first position and exposes said lens when said lens cover unit is located at said second position; and
an elastic body, fixed to one of said lens cover unit and said frame, is elastically deformable in a thickness direction of said display; and
at least one protrusion, while said lens cover unit slides between said first position and said second position, presses at least one action part of said elastic body in said thickness direction to elastically displace said elastic body, and after said elastic displacement, said at least one action part moves over said at least one protrusion, wherein auxiliary protrusions are disposed on both sides of said at least one protrusion so that said at least one protrusion and said two auxiliary protrusions define a first recessed portion and a second recessed portion.

13. The electronic apparatus of claim 12, wherein when said lens cover unit is at said first position, said at least one action part fits into said first recessed portion, and when said lens cover unit is at said second position, said at least one action part fits into said second recessed portion.

* * * * *